(12) United States Patent
Fujimoto et al.

(10) Patent No.: US 7,396,191 B2
(45) Date of Patent: Jul. 8, 2008

(54) CUTTING TOOL AND CUTTING MACHINE

(75) Inventors: Akihiro Fujimoto, Toyokawa (JP);
Taisuke Oyanagi, Toyokawa (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 11/481,507

(22) Filed: Jul. 6, 2006

(65) Prior Publication Data

US 2007/0006694 A1     Jan. 11, 2007

(30) Foreign Application Priority Data

Jul. 11, 2005     (JP) ............................. 2005-201624

(51) Int. Cl.
*B23Q 10/11*     (2006.01)
*B23B 27/16*     (2006.01)

(52) U.S. Cl. ....................................... 407/11; 407/113

(58) Field of Classification Search ......... 407/113–117, 407/11; 408/56
See application file for complete search history.

(56) References Cited

U.S. PATENT DOCUMENTS

| 6,957,933 B2 * | 10/2005 | Pachao-Morbitzer et al. .. 407/11 |
| 7,063,487 B2 * | 6/2006 | Hessman et al. .............. 407/11 |

FOREIGN PATENT DOCUMENTS

| JP | 08-025111 | 1/1996 |
| JP | 10-296506 | 11/1998 |

* cited by examiner

*Primary Examiner*—Willmon Fridie
(74) *Attorney, Agent, or Firm*—Brinks Hofer Gilson & Lione

(57) ABSTRACT

A cutting tool is constituted by plural faces and a tip portion structured with edges of the plural faces, wherein groove is formed on at least one of the plural faces. The groove is grid pattern and a dent portion is formed at some intersections of the grid pattern. Furthermore, a space is secured between one of ends of the groove and an edge constituted by a cutting face and a flank face. There is thus provided a cutting tool and a cutting machine capable of supplying cutting fluid to a tip of the tool or to a working point at the tip of it surely with simple structure.

18 Claims, 3 Drawing Sheets

CUTTING TOOL AND CUTTING MACHINE

CROSS-REFERENCE TO RELATED APPLICATIONS

This application is based upon and claims the benefit of priority from the prior Japanese Patent Application No. 2005-201624 filed on Jul. 11, 2005, the entire contents of which are incorporated herein by reference.

BACKGROUND OF THE INVENTION

1. Field of the Invention

The present invention relates to a cutting tool and a cutting machine, used in attached to a machine tool and the like, for cutting a working point on a work with cutting fluid being supplied there. More particularly, it relates to a cutting tool and a cutting machine used for fine processing on high precision mold core for optical surface.

2. Description of the Related Art

Since past, cutting operations by cutting tools have been carried out by supplying cutting fluid to a tip portion of the tools. This is to cool down a tool and a work and to remove chips there from. What is important for cutting operation is that cutting fluid shall constantly reach the working point. This is required especially when working on high precision mold core for optical surface and the like wherein fine structure of μm-order is to be formed by cutting. That is, if cutting fluid does not reach a working point when fine processing is done, shortage of the cutting fluid can possibly cause abrasion and breakage of the tool. If the abraded or broken tool keeps on cutting operation, machining accuracy deteriorates.

There have conventionally been devised the following methods for supplying cutting fluid to a tip portion of a tool. A first method is to spray cutting fluid from a nozzle arranged near to the cutting tool. Another method is to provide a fluid passage inside of a cutting tool to spout cutting fluid from an opening arranged near to the working point. For example, Japanese Unexamined Patent Publication No. 10-296506 discloses a cutting tool of which a nozzle is removably attached near to the cutting tool. Japanese Unexamined Patent Publication No. 8-25111 discloses a turning tool with a cutting fluid passage being formed inside.

However, the above-mentioned conventional tools have had the following problems. Relating to the conventional method to arrange a cutting fluid nozzle near to a tool, as disclosed in the Publication No. 10-296506, degree of closeness of the nozzle to the tool is limited. Furthermore, the tool and a working object meet each other very closely at a working point. Therefore, cutting fluid is hard to go into a narrow space between the tool and the working object. Consequently, there arises a problematic case that cutting fluid is not constantly supplied to the working point appropriately. Especially for the case of cutting operation of micro-level structure, a cutting tool itself is small. On that account, shortage of cutting fluid even for an instant can possibly cause damage to the tool. So, more reliable fluid supplying method has been demanded.

Furthermore, relating to another conventional method to provide a cutting fluid passage inside of the tool, as disclosed in the Publication No. 8-25111, it is difficult to design and form the passage and a supply route of cutting fluid. Especially for the case of fly-cut method and the like wherein a cutting tool is moved, special structure for cutting fluid supply is required, which is problematic.

SUMMARY OF THE INVENTION

The present invention has been attempted to solve the above-noted problems involved in the conventional cutting tools. Thus, an object of the invention is to provide a cutting tool and a cutting machine capable of supplying cutting fluid to an edge or to a working point at a tip of the edge of the tool surely with simple structure.

To achieve the above object of the present invention, there is provided a cutting tool comprising: a tip composed by plural faces including a cutting face and a flank face, wherein a groove shape is formed on at least one of the plural faces.

There is also provided a cutting machine comprising: a work holder; a cutting tool for cutting a work held by the work holder, the cutting tool comprising a tip composed by plural faces including a cutting face and a flank face, wherein a groove shape is formed on at least one of the plural faces; and a nozzle for spouting cutting fluid to the cutting tool.

According to the present invention, the tip corresponding to a working point is composed by plural faces and edges of the plural faces. Groove shape is formed on at least one of the plural faces. When cutting fluid is supplied to the face with groove geometry externally thereon, the fluid flows along the groove shape. Suppose that the groove shape is formed to head for the tip, cutting fluid is guided to the tip. Thereby, cutting fluid is surely supplied to an edge of the tool or to a working point at a tip of it with simple structure.

The inventive cutting tool and cutting machine thus can supply cutting fluid to an edge of the tool or to a working point at a tip of it surely with simple structure.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENT

First Embodiment

A first embodiment of the present invention will be described in detail below with reference to the accompanying drawings. The first embodiment is an application of the present invention to a cutting tool used for lathing and for fly-cut processing.

Figure 1:
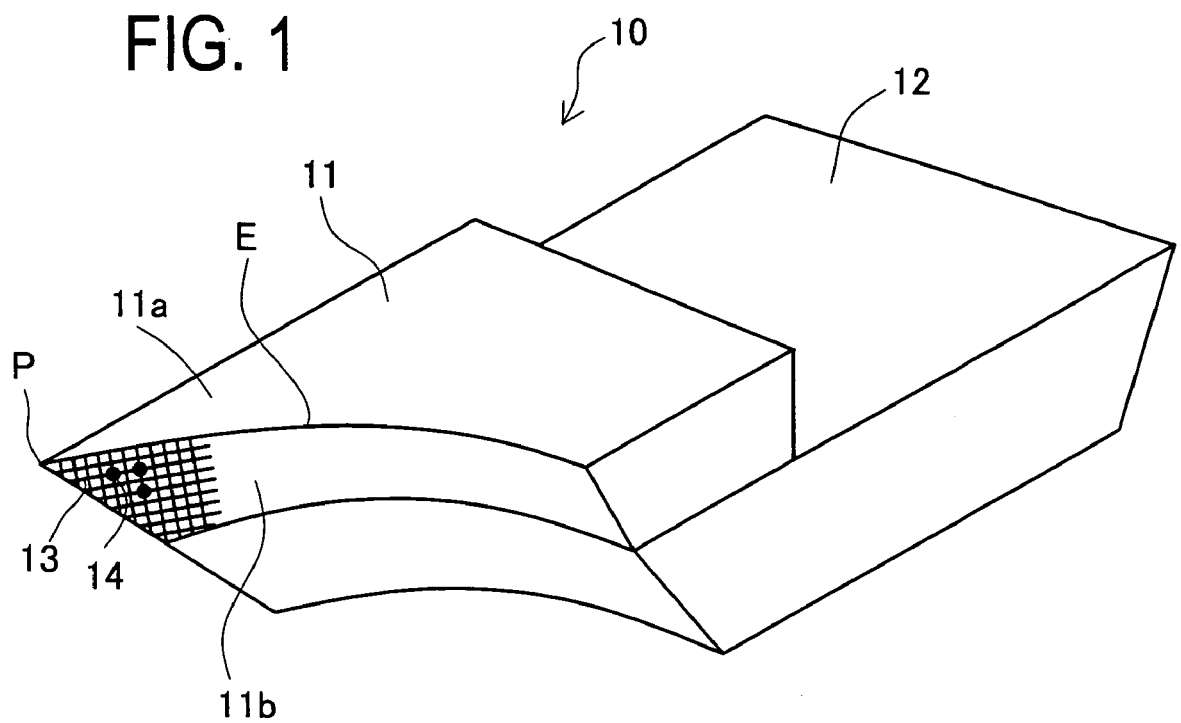
FIG. 1 shows schematic structure of a cutting tool directed to a first embodiment.

As shown in FIG. 1, a cutting tool 10 of the first embodiment is constituted by mounting a cutting blade 11 on a blade holder 12. In FIG. 1, an upper face and a front face of the cutting blade 11 correspond to a cutting face 11a and a flank face 11b, respectively. That is, a tip at left front side in FIG. 1 corresponds to a working point P when used. The flank face 11b is a curved face. A rear face of the cutting blade 11, hidden behind the cutting face 11a in FIG. 1, is also a flank face, but not a curved face. The cutting blade 11 is a single crystal diamond blade for fine cutting of μm-order.

Figure 2:
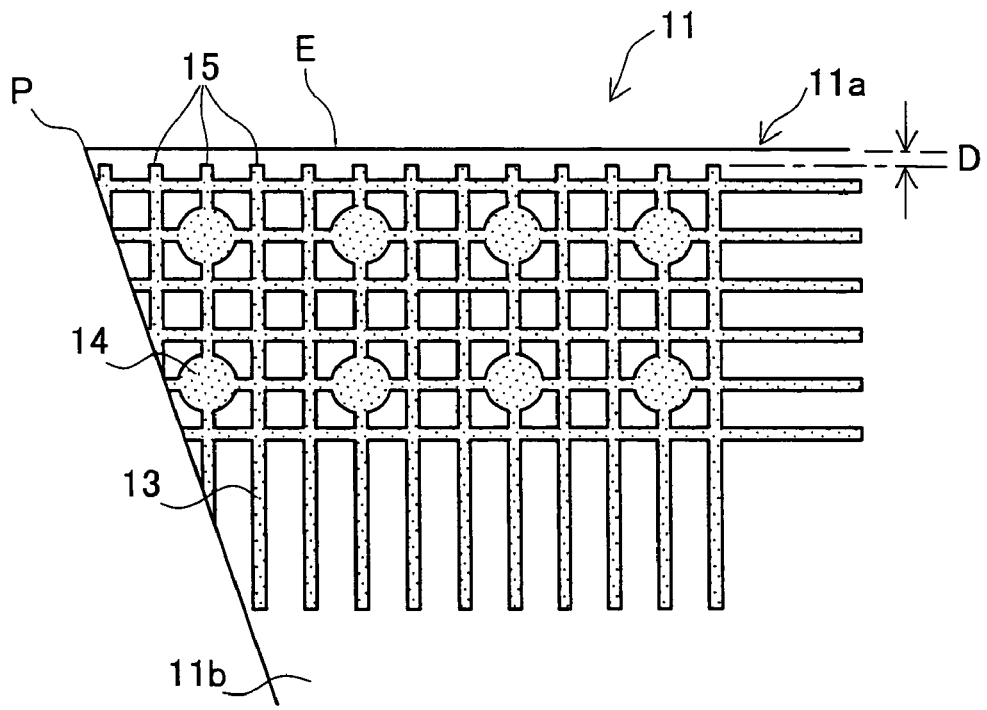
FIG. 2 shows schematic structure of a tip of the cutting tool directed to the first embodiment.

As shown in FIGS. 1 and 2, crossing grid patterned grooves 13 are formed on the flank face 11b of the cutting blade 11, in the vicinity of the working point P. Furthermore, there are formed pool-like dent portions 14 at some intersections of the grooves 13, which are wider than other portions of the grooves 13 in width. Cross sectional shape of the groove 13 may be rectangular, U-shape, V-shape, whatever, and depth of it is preferably between 0.01 μm and 0.5 mm. Furthermore, opening width of the groove 13 is preferably between 0.01 μm and 0.5 mm. The grooves 13 are provided so that cutting fluid can flow along the grooves 13 due to capillarity. Opening width of the groove 13 can be selected appropriately depending on viscosity and the like of cutting fluid, not restricted to width which can cause capillarity.

As shown in FIG. 2, ends of the grooves 13 do not reach an edge E formed with edges of the cutting face 11a and the flank face 11b. That is, there is a space between ends 15 of the grooves 13 and the edge E and a flat portion D is formed there. Therefore, shape of the edge E is not influenced by the grooves 13. Accordingly, the grooves 13 never affect cutting accuracy. Width of the flat portion D shall be a little bit narrower than opening width and depth of the grooves 13. As long as the flat portion has this extent of width, it never affects supply of cutting fluid to the edge E. Incidentally, a flat portion may also be formed at the other edge side, namely, at left bottom portion in FIG. 2.

Furthermore, the dent portions 14 are pool-like portions for pooling liquid, arranged on intersections of the grooves 13. Opening diameter of the dent portion 14 is preferably between 0.01 mm and 0.5 mm. Depth of it is preferably between 0.01 mm and 0.5 mm. Opening of the dent portion 14 is illustrated as round here, however, it is not restricted to a round shape: any shapes such as ellipse, polygon, and the like may be applicable as long as required capacity is secured. Those grooves 13 and the dent portions 14 can be formed on a diamond cutting blade by pulsed laser ablation working with a femtosecond laser or the like.

Figure 3:
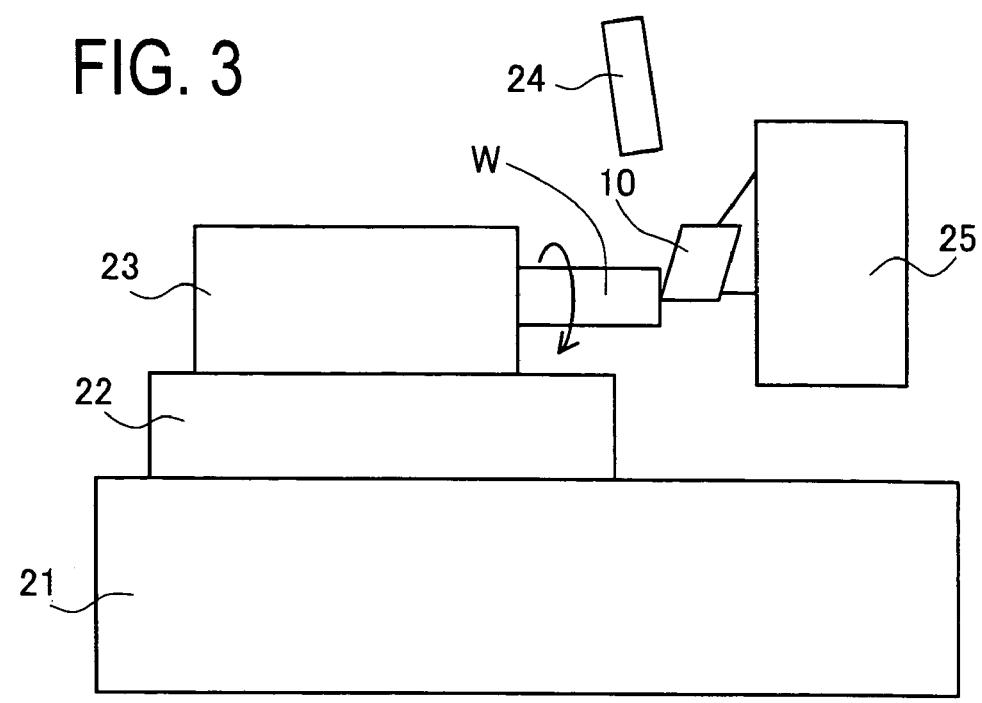
FIG. 3 shows schematic structure of a turning cutter which employs a cutting tool.
Figure 4:
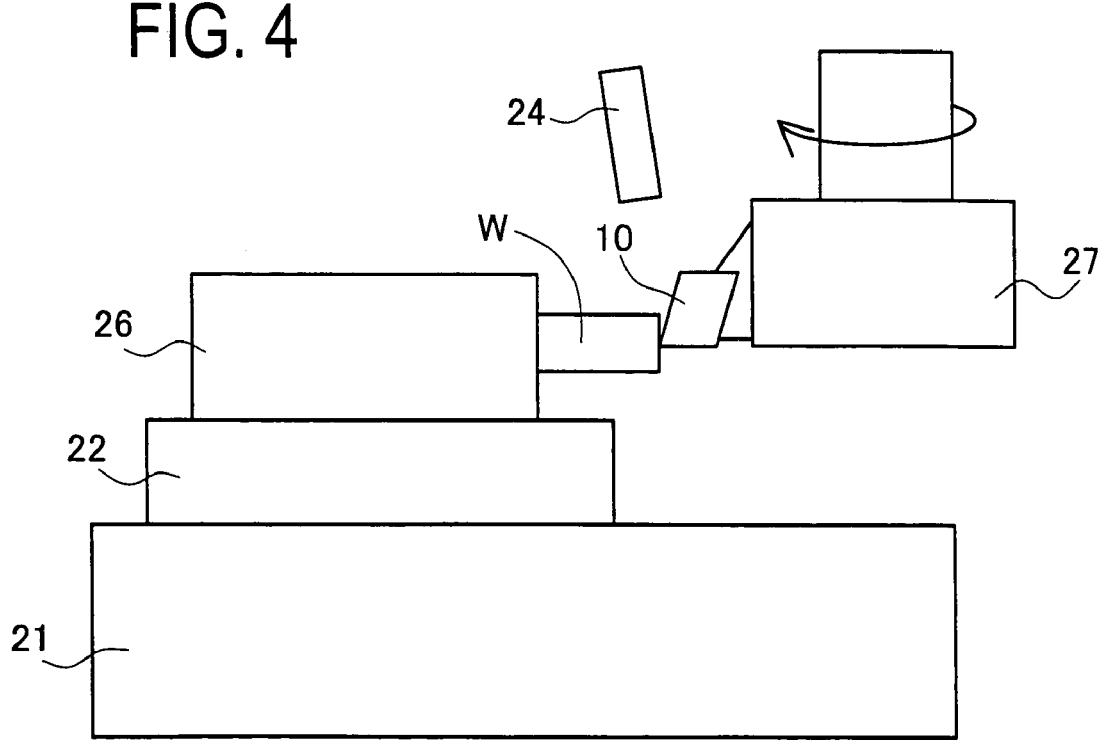
FIG. 4 shows schematic structure of a fly-cut cutter which employs a cutting tool.

FIGS. 3 and 4 show schematic structure of a cutting machine which employs the cutting tool 10 of the present embodiment. FIG. 3 shows a lathe machine consisting of a surface table 21, a driving table 22, a work rotator 23, a cutting fluid nozzle 24, and a tool holder 25. The cutting tool 10 is fixed and held by the tool holder 25. Location of a work W is adjusted by the driving table 22. The work W is held by the work rotator 23 and rotated as indicated with an arrow in FIG. 3.

Cutting fluid is sprayed in mist state from the cutting fluid nozzle 24 arranged in the neighborhood of the cutting tool 10 to the cutting blade 11. Both water-based one and oil-based one are applicable as cutting fluid. The cutting fluid nozzle 24 is set and arranged so that the sprayed cutting fluid hits the neighboring area of the working point P at the flank face 11b of the cutting blade 11.

FIG. 4 shows a fly-cut machine constituted by a surface table 21, a driving table 22, a cutting fluid nozzle 24, a work holder 26 and a rotating tool 27. The cutting tool 10 is attached to the rotating tool 27 and rotated as indicated with an arrow in FIG. 4 at predetermined speed. Location of a work W is adjusted by the driving table 22 and the work W itself is held by the work holder 26. Cutting fluid is sprayed in mist state from the cutting fluid nozzle 24 arranged in the neighborhood of the cutting tool 10 to the cutting blade 11. The cutting fluid nozzle 24 is set and arranged so that the sprayed cutting fluid hits the neighboring area of the working point P at the flank face 11b of the cutting blade 11.

Figure 5:
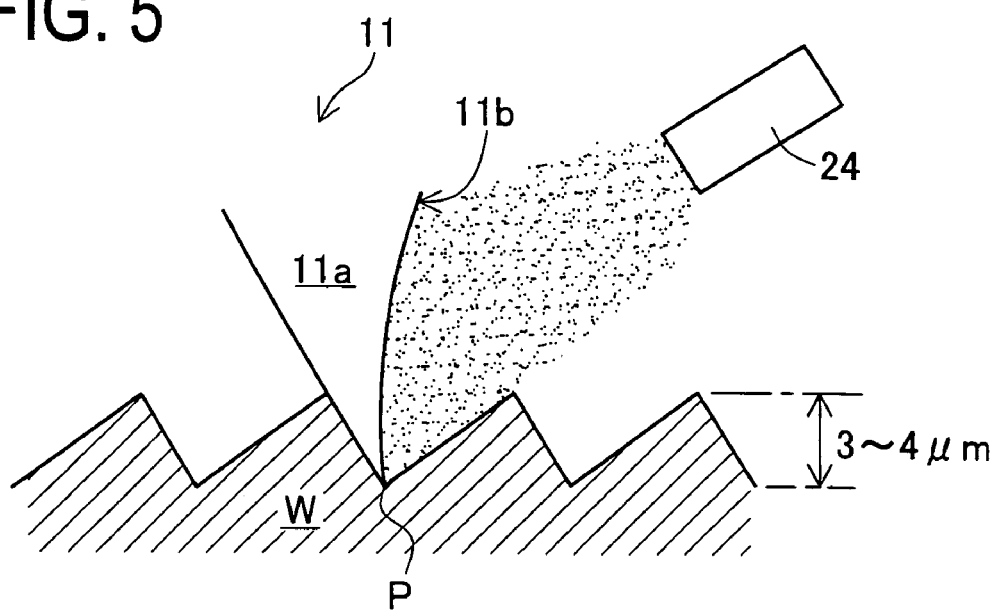
FIG. 5 shows state of cutting operation by the cutting tool.

At cutting operation with the above such cutting machine, the cutting blade 11 gets in contact with the work W, as shown in FIG. 5. Cutting is carried out by making the work W and the cutting blade 11 move relatively. While cutting operation, cutting fluid is spouted in mist state from the cutting fluid nozzle 24 and supplied to the concave flank face 11b. Since the flank face 11b is a concave face, cutting fluid is held on this face. That is, cutting fluid is prevented from running out to other faces of the cutting blade 11 at once. So, cutting fluid is collected in the grooves 13 and the dent portions 14 enough. Furthermore, since the grooves 13 form crossing grid pattern, cutting fluid can spread along the grid pattern even in the case the fluid hit only a part of the area where the grooves 13 are formed. Accordingly, cutting fluid spreads out the flank face 11b entirely and reaches the edge E and the working point P.

Since the grooves 13 and the dent portions 14 are formed on the flank face 11b, some extent of cutting fluid is collected. Cutting fluid collected in the dent portions 14 flows along the grooves 13, whereby the fluid is supplied to the edge E constituted by the cutting face 11a and the flank face 11b and to the working point P. Cutting fluid is supplied to the grooves 13 from dent portions 14, whereby shortage of cutting fluid in the grooves 13 is avoided. That is, after cutting fluid in the grooves 13 is used, cutting fluid collected in the dent portions 14 is supplied to the grooves 13. Therefore, it is not necessary to arrange the cutting fluid nozzle 24 close to the cutting tool 10 excessively. The cutting fluid nozzle 24 thus can be arranged at location not intervening with the cutting tool 10 and the work W.

As described, the cutting tool 10 directed the first embodiment has the cutting blade 11 of which flank face 11b has grooves 13 and the dent portions 14 thereon. Therefore, cutting fluid is collected in the grooves 13 and dent portions 14 and delivered to the edge E and to the working point P. On that account, even though the cutting fluid nozzle 24 is arranged apart a little from the working point P, cutting fluid is surely supplied there. That is, it is not required to form a fluid passage inside the tool and a supply route thereto. Therefore, it can be applied to the conventional machine composition where cutting fluid is sprayed in mist state externally. Thereby, cutting fluid can be supplied to an edge of a tool and to the working point at the tool's edge portion for sure with simple structure.

Second Embodiment

A second embodiment of the present invention will be described in detail below with reference to the accompanying drawings. The second embodiment is an application of the present invention to a cutting tool used for lathing and for fly-cut processing.

Figure 6:
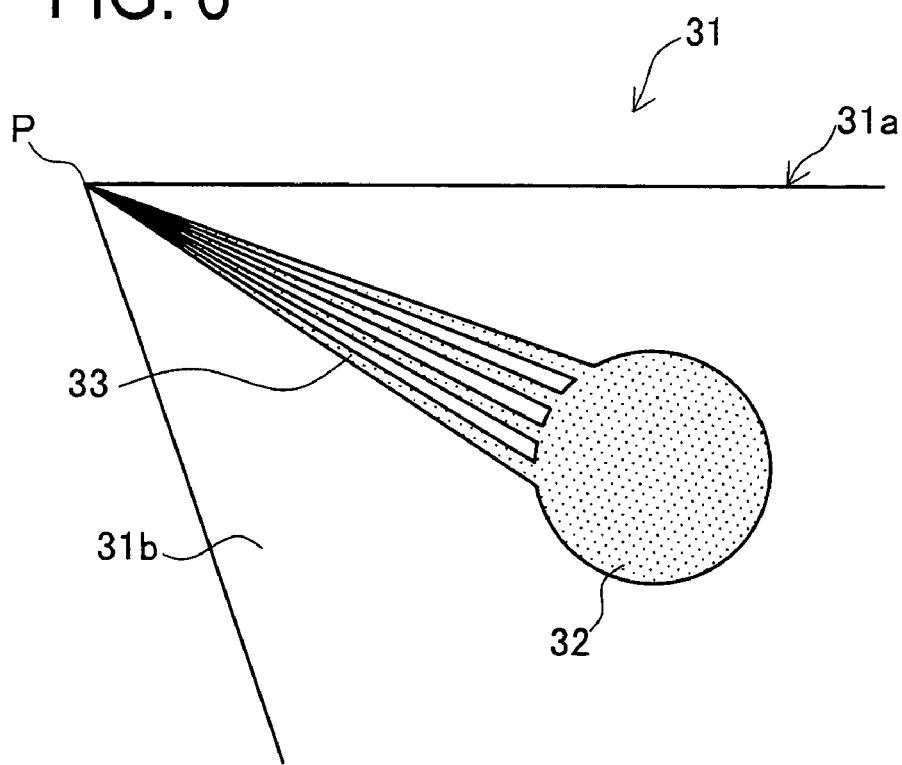
FIG. 6 shows schematic structure of a tip of a cutting tool directed to a second embodiment.

An external form of a cutting blade 31 of this embodiment is similar to that of the cutting blade 11 directed the first embodiment. Similar to the cutting blade 11, the cutting blade 31 has a working point P at the tip constituted by a cutting surface 31a and a flank face 31b. As shown in FIG. 6, there are formed a dent portion 32 and plural grooves 33 reaching the working point P from the concave portion 32, on the flank face 31b. The second embodiment intends to supply cutting fluid to the working point P intensively.

Similar to the first embodiment, cross sectional shape of the grooves 33 and opening shape of the dent portion 32 may be any shapes. On the other hand, opening diameter of the dent portion 32 should be larger than that of the dent portion 14 directed to the first embodiment, preferably between 0.1 mm and 1.5 mm. The grooves 33 are designed to connect the dent portion 32 and the tip portion of the cutting blade 31, and become gradually narrower as heading for the tip portion. A slight space may be arranged between the tip and ends of the grooves 33 and a flat portion may be provided there.

When cutting operation is carried out by attaching the cutting tool of the present embodiment to a lathe machine or a fly-cut machine, the cutting blade 11 is made contact with a work W, as shown in FIG. 5. Cutting fluid is collected in the dent portion 32 and supplied to the working point P along the grooves 33 since the grooves 33 is connecting the dent portion 32 and the working point P. Similar to the first embodiment, the second embodiment can apply the structure to spray cutting fluid in mist state externally, and cutting fluid is supplied to the working point P for sure.

As described, the second embodiment makes it possible to supply cutting fluid to a working point at the tool's edge portion for sure with simple structure, similar to the first embodiment.

The embodiments were described above merely as illustrative examples, but it is nothing to limit the invention in any way. Therefore, the invention can obviously be improved or modified in various ways without deviating from its essentials.

For instance, grooves are formed on a flank face of cutting blade in both of the embodiments; however, they may be formed on a cutting face. For instance, the groove shapes both of the first and second embodiments may be applied to two or more faces of a cutting blade purposely, e.g., grid-patterned grooves of the first embodiment for a flank face and intensive type grooves for cutting face. For instance, drawings directed to the first embodiment show as if intervals between adjoining grooves 13 are constant, however, the grid pattern may be made finer as closer to the tip portion. Furthermore, it is not always required to make depth and width of grooves constant. For instance, the number of grooves and angles between adjoining grooves shown in the drawings are merely as illustrative examples, but it is nothing to limit the invention in any way.

What is claimed is:

1. A cutting tool comprising:
a tip having a cutting face and a flank face;
a plurality of intersecting passive fluid collection grooves disposed in the cutting face and/or the flank face;
the plurality of passive fluid collection grooves configured to passively collect a cutting fluid and direct a flow of the cutting fluid toward the tip, the cutting fluid dispensed external to the cutting tool, and supplied from a source not in direct communication with cutting tool; and wherein
the plurality of passive fluid collection grooves direct the cutting fluid toward the tip by capillary action.

2. A cutting tool according to claim 1, including a pool-like recess in fluid communication with the respective groove.

3. A cutting tool according to claim 1, including a plurality of pool-like recesses, each formed at an intersection of two grooves.

4. A cutting tool according to claim 1, wherein the plurality of grooves converge in a direction toward the tip.

5. A cutting tool according to claim 1, wherein the grooves intersect forming a grid pattern.

6. A cutting tool according to claim 1, including a flat portion disposed between an end of the grooves and an edge of a face on which the grooves are formed.

7. A cutting tool according to claim 1, wherein the cutting face and/or the flank face is concave in shape.

8. A cutting tool according to claim 1, wherein the plurality of grooves are formed on a flank face.

9. A cutting tool according to claim 1, wherein the tip is made of single crystal diamond.

10. A cutting machine comprising:
a work holder;
a cutting tool for cutting a work held by the work holder, the cutting tool including
a tip having a cutting face and a flank face;
a plurality of intersecting passive fluid collection grooves disposed in the cutting face and/or the flank face;
a nozzle for dispensing cutting fluid external to the cutting tool;
the plurality of passive fluid collection grooves configured to passively collect the cutting fluid dispensed by the nozzle and direct a flow of the cutting fluid toward the tip, the cutting fluid dispensed external to the cutting tool, and supplied from a source not in direct communication with the cutting tool; and
wherein the plurality of passive fluid collection grooves direct the cutting fluid toward the tip by capillary action.

11. A cutting machine according to claim 10, including a pool-like recess in fluid communication with the re grooves.

12. A cutting machine according to claim 10, including a plurality of pool-like recesses, each formed at an intersection of two grooves.

13. A cutting machine according to claim 10, wherein the plurality of grooves converge in a direction toward the tip.

14. A cutting machine according to claim 10, wherein the grooves intersect forming a grid pattern.

15. A cutting machine according to claim 10, including a flat portion disposed between an end of the grooves and an edge of a face on which the grooves are formed.

16. A cutting machine according to claim 10, wherein the cutting face and/or the flank face is concave in shape.

17. A cutting machine according to claim 10, wherein the grooves are formed on a flank face.

18. A cutting machine according to claim 10, wherein the nozzle dispenses the cutting fluid in the form of a mist.

* * * * *

UNITED STATES PATENT AND TRADEMARK OFFICE
CERTIFICATE OF CORRECTION

PATENT NO. : 7,396,191 B2
APPLICATION NO. : 11/481507
DATED : July 8, 2008
INVENTOR(S) : Akihiro Fujimoto et al.

It is certified that error appears in the above-identified patent and that said Letters Patent is hereby corrected as shown below:

On the Title Page

In item (75), delete "Toyokawa" and substitute --Toyokawa-shi-- in its place (both occurrences).

Line 1, under "ABSTRACT", after "constituted by" delete "plural" and substitute --a plurality of-- in its place.

Line 2, under "ABSTRACT", after "faces, wherein" insert --a--.

Line 3, under "ABSTRACT", after "The groove is" insert --in a--.

Line 6, under "ABSTRACT", before "ends of the groove" insert --the--.

Lines 9-10, under "ABSTRACT", immediately after "point at the tip" insert --.--, and delete "of it surely with simple structure.".

In the Claims

In column 6, claim 11, line 36, immediately after "in fluid communication with the" delete "re".

Signed and Sealed this

Seventh Day of July, 2009

JOHN DOLL
*Acting Director of the United States Patent and Trademark Office*